No. 823,407. PATENTED JUNE 12, 1906.
W. A. GILLENTINE.
CULTIVATOR.
APPLICATION FILED NOV. 4, 1905.

Witnesses
Edwin G. McKee
H. Allen

Inventor
W. A. Gillentine
By Victor J. Evans
Attorney

UNITED STATES PATENT OFFICE.

WILLIAM A. GILLENTINE, OF GOLDTHWAITE, TEXAS.

CULTIVATOR.

No. 823,407.  Specification of Letters Patent.  Patented June 12, 1906.

Application filed November 4, 1905. Serial No. 285,884.

*To all whom it may concern:*

Be it known that I, WILLIAM A. GILLENTINE, a citizen of the United States, residing at Goldthwaite, in the county of Mills and State of Texas, have invented new and useful Improvements in Cultivators, of which the following is a specification.

The invention relates to an improvement in cultivators, and particularly to a means for adjusting cultivator-shovel gangs relative to each other.

The main object of the present invention is the provision of a lever-and-ratchet mechanism adapted for connection in a cultivator construction and operating to adjust the shovel-gangs relative to each other.

The invention will be described in detail in the following specification, reference being had particularly to the accompanying drawings, in which—

Figure 1:
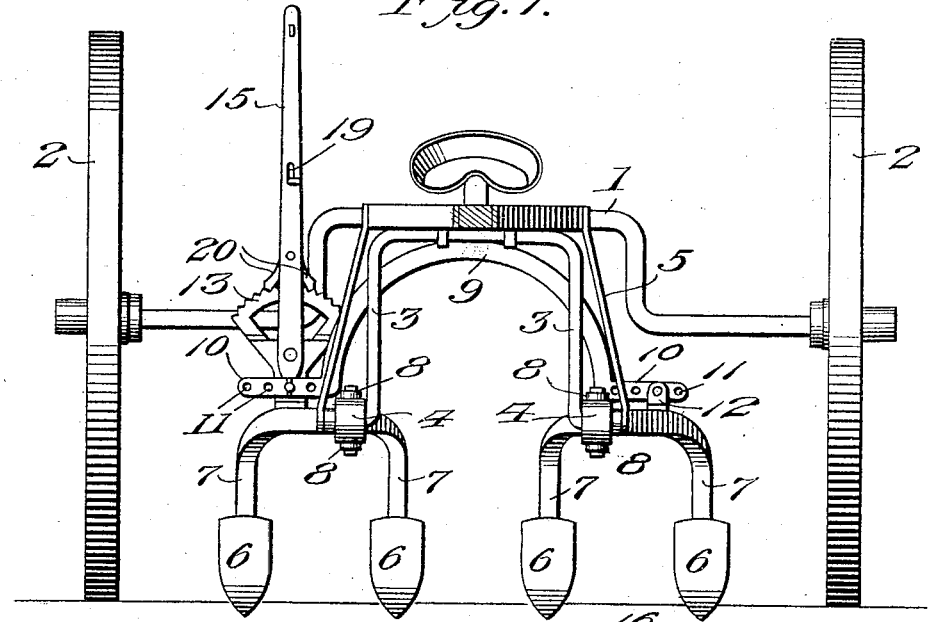
Figures 2, 3:
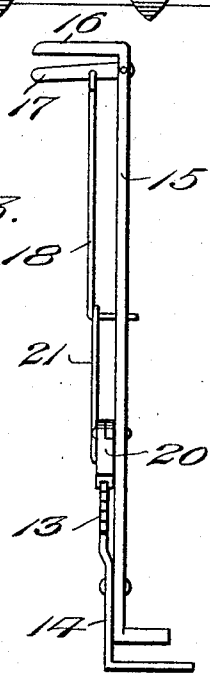

Figure 1 is a front elevation of a cultivator, illustrating the application of my invention thereto. Fig. 2 is a rear elevation of the lever-and-ratchet mechanism. Fig. 3 is a side elevation of the same.

Referring to the drawings, the cultivator comprises the usual frame 1, supported on wheels 2, to which frame the cultivator-arch 3 of the usual construction is connected. The terminals of the arch are bent at right angles to the main portion, extending practically in parallel relation to the axle, and on each of said ends is revolubly supported a collar 4, the end of the arch being further supported from the main frame by braces 5.

The cultivator-gangs comprising the shovels 6, supported at the free ends of the divergent arms 7, are movably supported in the collars 4 by pivotally connecting the forward ends of said arms therewith, as at 8, as is usual in cultivator constructions. The gangs are connected through the medium of an arch-bar 9, centrally arched and having laterally-extending ends 10, each formed with a series of openings 11. One of the arms 10 is connected with one of the cultivator-gangs through a strap 12, secured to one of the arms 7 and to the arm 10, while the other arm 10 is connected through the medium of my improved lever-and-ratchet mechanism now to be described.

The lever-and-ratchet mechanism in its preferred form comprises a notched segment 13, having a depending lip 14, designed to be fixedly secured to one of the arms of the opposing cultivator-gang. A lever 15 is pivotally secured to the body of the segment member 13, said lever extending below its pivotal connection and engaging one of the openings 11 in the free arm 10 of the arch-bar. The lever 15 extends above the notched segment and is laterally bent at the upper ends to provide a handle 16, directly beneath which is secured a grip-piece 17, pivotally supported at its inner end on the lever. Depending from said grip-piece in alinement with the lever is a connection 18, preferably of wire, which terminates about midway of the length of the lever and is bent inward toward the lever, its free end passing loosely through an opening 19, provided in the lever-body and serving to guide said connection 18 in operation. Duplicate pawls or dogs 20 are pivotally mounted on the lever and disposed in opposite positions, being thereby adapted to engage the teeth on the notched segment 13 from opposite directions and prevent movement of the lever relative to the segment. A spring-loop connection 21 is terminally connected to the respective dogs, the loop end straddling the right-angle portion of the connection 18. The loop 21 is of spring construction, being so arranged that the tension is normally exerted to hold the arms of the loop in close contact, so that when connected with the dogs the arms are spread beyond their normal position, whereby a spring tension is exerted upon the dogs to hold them in engagement with the teeth of the segment. Adjacent the arc of the segment 13 the lever is cut out, and the cut-out portion is upwardly bent to loosely embrace the arc of the segment, thus providing a guide 22 for the lever in operation. As thus constructed, the operator by grasping the handle 16 and grip 17 and exerting pressure will lift the dogs 20 from engagement with the teeth on the segment and free the lever from the segment. A lateral movement of the upper end of the lever will cause a relative movement toward or away from each other and the cultivator-gangs, as will be obvious. Upon releasing the grip 17 the dogs 20 will be forced into locking engagement with the teeth by the tension of the loop. The lever-and-ratchet mechanism described is of simple construction and few parts, all positive connections being avoided as far as possible to provide for the ready renewal of any particular part.

Having thus described the invention, what is claimed as new is—

1. A cultivator comprising shovel-gangs, and a lever-and-ratchet mechanism mediately connected to one gang and immediately connected to the other gang, said lever when locked to the ratchet operating to simultaneously adjust the gangs in the same direction and when unlocked upon the ratchet serving to relatively adjust the gangs in opposite directions.

2. A cultivator comprising shovel-gangs movably supported on the frame, an arch-bar adjustably connected to one of said gangs, and lever-and-ratchet mechanism between the arch-bar and the remaining gang, the ratchet member of said mechanism being connected to the shovel-gang and the lever of said mechanism being connected to the arch-bar.

3. A cultivator comprising shovel-gangs movably supported on the frame, an arch-bar adjustably connected to one of said gangs, a ratchet member connected to the other gang, a lever pivotally supported on the ratchet member and adjustably connected to the adjacent end of the arch-bar, and means for securing said lever and ratchet member together.

4. A cultivator comprising shovel-gangs, an arch-bar connected to one of the gangs, a lever-and-ratchet mechanism, and a connection between said mechanism and one of the gangs, and a second connection between said mechanism and the arch-bar, said connections serving in the operation of the lever when locked to the ratchet to simultaneously adjust the gangs in the same direction, and when unlocked from the ratchet to relatively adjust the gangs in the opposite directions.

In testimony whereof I affix my signature in presence of two witnesses.

WILLIAM A. GILLENTINE.

Witnesses:
E. W. H. PARKER,
E. B. ANDERSON.